Aug. 11, 1959  F. HÄUSSLER  2,899,179
ROTARY REGENERATIVE PREHEATER FOR AIR FLOWS OF
DIFFERENT PRESSURE CONNECTED IN PARALLEL
Filed Aug. 17, 1955  2 Sheets-Sheet 1

INVENTOR
Friedrich Häussler
BY
Jarvis C Marble

Aug. 11, 1959  F. HÄUSSLER  2,899,179
ROTARY REGENERATIVE PREHEATER FOR AIR FLOWS OF
DIFFERENT PRESSURE CONNECTED IN PARALLEL
Filed Aug. 17, 1955  2 Sheets-Sheet 2
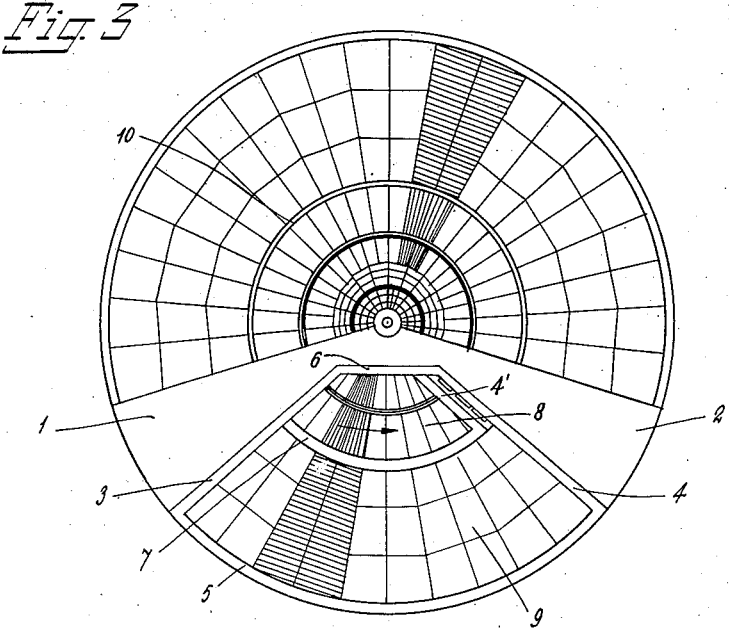
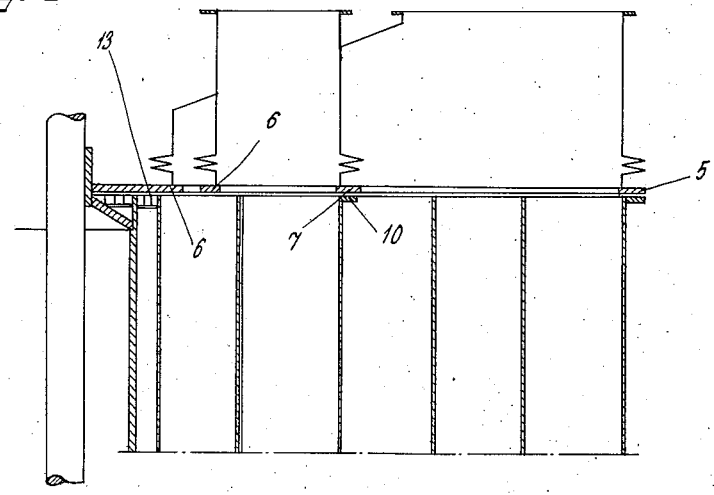
INVENTOR.
Friedrich Häussler
BY
his Attorney

United States Patent Office 2,899,179
Patented Aug. 11, 1959

2,899,179

ROTARY REGENERATIVE PREHEATER FOR AIR FLOWS OF DIFFERENT PRESSURE CONNECTED IN PARALLEL

Friedrich Häussler, Neckargemund, Germany, assignor to Svenska Rotor Maskiner Aktiebolag, Nacka, Sweden, a corporation of Sweden Application August 17, 1955, Serial No. 528,988

Claims priority, application Germany August 28, 1954

3 Claims. (Cl. 257—267)

This invention relates to a rotary regenerative preheater for air flows of different pressure connected in parallel.

Upon operation of modern heat power plants, particularly such operating with fuel such as powdered coal or oil, the combustion air is divided into a primary and a secondary air flow, respectively, the primary air flow being at a higher pressure. Preheating of these two air flows of different pressure is generally effected in two separate preheaters. The secondary air flow forming the main part of the total amount of combustion air is ordinarily preheated in a rotary regenerative preheater, whereas preheating of the primary air flow which is substantially smaller in quantity but of a higher pressure takes place in a smaller preheater, ordinarily a recuperator. It has further been suggested to pass the total air flow through a rotary preheater and to separate the primary air flow after such preheating. Since this primary air flow then has to be brought to the required higher pressure, a hot air fan is necessary which is not desirable. Therefore, this solution has not been carried into effect.

Contrary thereto this invention discloses a new solution which enables one single rotary regenerative preheater to suffice by dividing the air channel into two channels which are practically independent of one another so that the two air streams may have quite different pressures.

The invention may be applied to a rotary regenerative preheater having movable sector plates for sealing dead rotor zones in which between the edges of the plates and the stationary housing sealing means are provided which cooperate with corresponding sealing means disposed at the periphery of the rotor and at the rotor shaft to form a closed sealing line around the complete circumference of the air passage. The present invention contemplates a further development of the preheater according to such construction and according to the invention the preheater is characterized by the fact that the air channel at each end face of the rotor is divided into two separate channels by an arcuate concentric seal registering with a corresponding concentric partition wall of the rotor. A preheater according to the invention, which may be utilized for preheating of two air flows of different pressure connected in parallel, involves a material simplification and reduction of cost in relation to solutions hitherto employed in practice.

To illustrate the invention in the drawing:

Figs. 1 to 3 show in simplified manner three embodiments in top views of an end face of the rotor.

Fig. 4 shows a partial axial section on a somewhat enlarged scale illustrating more clearly some details of the construction.

Figure 1:
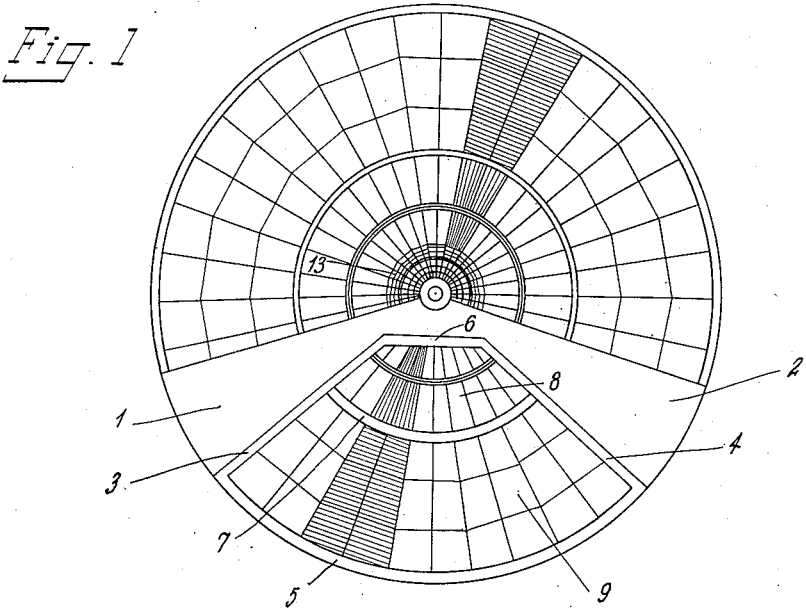

In all of the three embodiments the end face of the rotor is in the ordinary manner divided into a gas passage (in Figs. 1 to 3 the upper passage) having the larger centre angle and a smaller air passage (occasionally below). In the transition zones separating the two channels movable sector plates 1 and 2 are provided which seal off the dead rotor zones. These sealing plates 1 and 2 can adjust themselves to the distortions of the rotor occurring during operation due to heat expansion.

Sealing strips 3 and 4 are mounted to the inner edges of the sealing plates 1 and 2 which are completed by a peripheral bridging strip 5 and a bridging strip 6 adjacent the rotor shaft to form a closed line. A similar closed line of corresponding strips is disposed on the stationary end wall of the housing so that these two lines of strips sealingly enclose the through passing channel along its entire circumference. The nature of the sealing of the strips of the movable system shown in Figs. 1 to 3, relative to the registering strips disposed on the end wall of the housing, is of secondary importance to the inventive idea of the present invention. In many applications it may be sufficient with simple strips which are somewhat displaced relative each other and disposed opposite each other to function as a labyrinth seal. It is, however, more advantageous to use a gas-tight flexible diaphragm or a movable bellows which is at one side secured to the movable strips shown and at the other side to the corresponding strips on the stationary end wall of the housing. It is, however, evident that by means of a seal of this or similar kind along the closed line 3—5—4—6 the air channel is sealed off relative to the gas channel. In this respect the embodiments according to the present invention are similar to the preheaters described in U.S. Patent No. 2,852,234 granted September 16, 1958, and U.S. Patent No. 2,873,952 granted February 17, 1959, said patents maturing from applications copending with this application, other details of constructions disclosed therein also being adaptable for the present invention.

The principal characteristic feature of the preheater according to this invention, differing from that of the preheaters according to the above mentioned patents, is the arcuate concentric seal 7 which divides the air channel into two separate channels, that is, the primary air channel 8 and the secondary air channel 9. Accordingly, such a seal 7 is provided at each end face of the rotor, whereas the rotor itself necessarily is divided by a correspondingly concentric rotor partition wall 10.

In the embodiment shown in Fig. 1 the radial sealings 3 and 4 are common to the two subchannels 8 and 9. As the higher pressure in the primary air channel 8 is followed by greater losses in leakage and sluiced air, the embodiment according to Fig. 2 attempts to reduce these losses so that all of the sealings of the primary air channel 8 are made separately. These sealings form a closed line 3'—7—4'—6' which is disposed within the line of sealings 3—5—4—6 of the secondary air channel. Between corresponding sealings 3 and 3', 4 and 4' as well as 6 and 6', respectively, further small intermediate spaces are left which communicate with the larger secondary air channel 9. Evidently the leakage and sluiced air passing from the primary air channel 8 through the sealings 3'—7—4'—6' does not enter into the flue gas channel to be lost, but enters into the secondary air channel 9 so that it will be utilized again.

The embodiment shown in Fig. 3 forms an intermediate solution between the two embodiments described above, as it is not absolutely necessary to have the cost increasing sealing along the entire circumference of the primary air channel 8. On the contrary, it is sufficient to provide this double sealing on that radial boundary edge of the primary air channel 8 at which the rotor moves from the air side to the gas side, since at the other radial boundary edge 3 the effect of the sluiced air substantially neutralizes that of the leakage air so that here special provisions are not so important. The direction of rotation of the rotor in Fig. 3 is indicated by an arrow (counterclock direction).

As regards the details of the design it is to be mentioned that preferably an elastic gas-tight metal bellows is used as sealing means. This sealing bellows is shown more in detail in Fig. 4. Corresponding to the circular arc shaped part of the metal bellows a row of tangential walls of the rotor is bordered above and below by a rotor wall flange ring 10 fixed by welding and being of the same diameter, so that reckoned in the radial direction leakage air merely in a smaller amount may pass over such as is permitted by the small clearance between this rotor wall flange 10 and the stationary metal bellows ring 7.

In the simpler embodiment according to Fig. 1 the circular arc shaped portion of the metal bellows abuts at both sides on the radial seals 3 and 4 of the secondary air channel 9 and is rigidly secured with its movable portion to the movable sector sealing plates 1 and 2 of the radial sealings so that the movements of adjustment of the sealing plates and those of the metal bellows are connected with each other.

Figure 2:
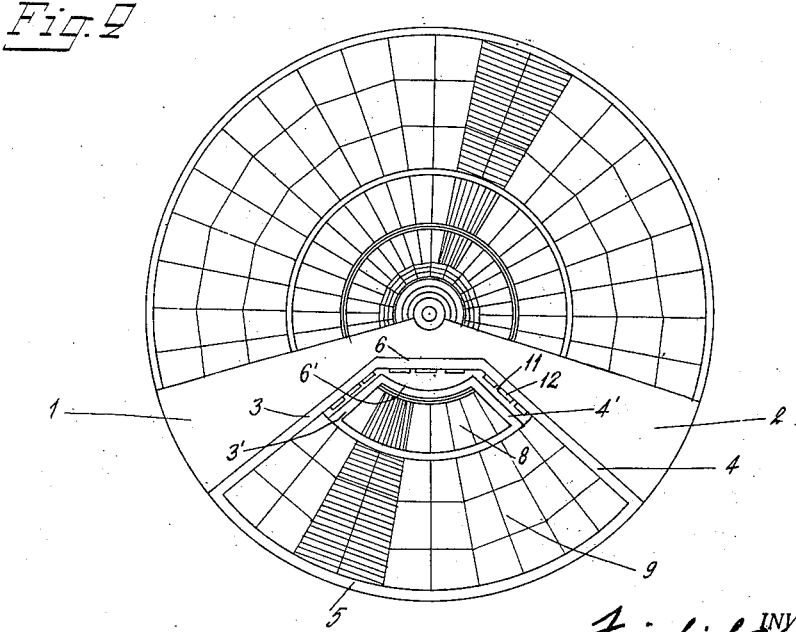

The drawback of the embodiment shown in Fig. 1 is that the total pressure drop is effective from the primary air side to the flue gas side and that the relatively great volume of leakage air passing over due to this is lost for combustion, is avoided by the embodiment shown in Fig. 2. The double radial seal will certainly result in a somewhat greater part of the heating surface being ineffective. To make this part of the heating surface, which is ineffective through the shielding, as small as possible, the radial sealing strip secured to a metal bellows is made as narrow as possible. To ensure that in every position at least one radial wall is positioned below the sealing strip to prevent a cross flow of air, the radial walls of the rotor in the primary air portion are disposed narrower than those in the outer secondary air portion. Preferably the heating plates are disposed tangentially in the secondary air portion and radially in the primary portion, as shown, by way of example, in Figs. 1 to 3 for two sectors.

In order to obtain a coupling for the necessary movements of adjustment, the radial sealing strips 3' and 4' are rigidly connected with the movable sector plates 1 and 2 and with the radial seals 3 and 4 of the secondary air passage by means of a number of arms 11, the radial sealing strips and the movable sector plates 1 and 2 being cut in one and the same plate. Between adjacent sealing strips 3 and 3', 4 and 4' as well as 6 and 6', respectively, slots 12 are cut out in all cases, as clearly shown in Fig. 2, said slots serving to equalize the pressure of the leakage air passing over and enabling this leakage air to be led into the secondary air passage 9. The same is true for the embodiment according to Fig. 3 for the intermediate space between the strips 4 and 4' therein.

In all embodiments a seal is provided adjacent the rotor shaft, as shown in Fig. 4, between the rotor and the end plate of the housing. This seal comprises a plurality of concentric rings 13 in the rotor, said rings extending to the upper face of the rotor and establishing the same effect as that of a labyrinth seal.

What I claim is:

1. A rotary regenerative heat exchanger for transferring heat from a gaseous medium to air, comprising a stationary structure provided with end plates forming sector plates extending from the central portion of said structure to the circumference thereof for separating streams of air and gas passing through the exchanger, said structure providing an inlet conduit and an outlet conduit for passage of gas to and from the exchanger and two separate inlet conduits and two separate outlet conduits for passage of air through said exchanger, said separate inlet conduits being at the same end of the exchanger and said separate outlet conduits being at the opposite end of the exchanger, a rotor mounted to rotate between said sector plates and having a plurality of sector-like compartments carrying heat transferring material, said sector plates being movably mounted for sealing against said rotor independent of the distortions of said rotor due to heat expansion, said stationary structure having a common arcuate partition wall at each end of said rotor for separating said air inlets and outlets, said partition wall being concentric with the axis of rotation of the rotor, said rotor being divided into an inner primary channel and an outer secondary channel by a circular partition wall aligned with said arcuate partition wall, one of said inlets and outlets communicating with said primary channel for conducting high pressure primary air therethrough, the other of said inlets and outlets communicating with said secondary channel for conducting low pressure secondary air therethrough, said sector plates being provided with radially extending sealing means cooperating with said rotor for sealing the radial edges of said inlets and outlets as well as circumferentially extending sealing means for sealing the same with respect to said air inlet and outlet conduits, sealing means rigidly conected to said sector plates for sealing between said circular partition wall and said arcuate partition wall and additional radial sealing means on said stationary structure cooperating with said rotor and said sealing means for sealing between said circular partition wall and said arcuate partition wall for sealing the radial edges of said primary air channel at which the rotor moves from the air side to the gas side, there being a space provided between said first mentioned radial sealing means and said additional radial sealing means and passages communicating with said primary air channel and said space whereby leakage air leaving said primary air channel may pass through said passages into said space and to said secondary air channel.

2. An apparatus as defined in claim 1 in which further additional radial sealing means are provided on said stationary structure cooperating with said rotor for sealing the radial edges of said primary air chanel at which the rotor moves from the gas side to the air side, there being an additional space provided between said first mentioned radial sealing means and said further additional radial sealing means, whereby leakage air leaving said primary air channel at both radial edges may pass through said spaces to said secondary air channel.

3. An apparatus as defined in claim 1 in which said heat transferring material comprises plates disposed tangentially in said secondary air channel and plates disposed radially in said primary air channel.

References Cited in the file of this patent

UNITED STATES PATENTS

| | | |
|---|---|---|
| 1,970,534 | Colby et al. | Aug. 14, 1934 |
| 2,337,907 | Lundstrom | Dec. 28, 1943 |
| 2,347,857 | Waitkus | May 2, 1944 |
| 2,681,209 | Mudersbach | June 15, 1954 |